United States Patent [19]

Nakajima

[11] Patent Number: 4,480,216
[45] Date of Patent: Oct. 30, 1984

[54] MOTOR DRIVING CIRCUITS

[75] Inventor: Fumio Nakajima, Tokyo, Japan

[73] Assignee: Citizen Watch Co., Ltd., Tokyo, Japan

[21] Appl. No.: 437,266

[22] Filed: Oct. 28, 1982

[30] Foreign Application Priority Data

Nov. 10, 1981 [JP] Japan ............................ 56-180158

[51] Int. Cl.$^3$ ............................................. G05B 5/00
[52] U.S. Cl. ........................ 318/331; 318/345 B; 318/345 AB; 318/345 F; 307/271
[58] Field of Search ........... 318/331, 332, 341, 345 B, 318/345 AB, 345 F; 368/155, 156, 217, 218; 328/59-61, 191; 307/271

[56] References Cited

U.S. PATENT DOCUMENTS

| | | | |
|---|---|---|---|
| 3,414,791 | 12/1968 | Munson et al. | 318/331 |
| 3,488,756 | 1/1970 | Skrivanek | 318/331 |
| 3,504,260 | 3/1970 | Staples | 318/331 |
| 3,588,654 | 6/1971 | Balazs | 318/331 |
| 3,624,474 | 11/1971 | Nolf | 318/331 |
| 3,824,781 | 7/1974 | Diersbock | 368/155 |
| 4,064,443 | 12/1977 | Yamada et al. | 318/331 |
| 4,266,168 | 5/1981 | Andersen | 318/331 |

OTHER PUBLICATIONS

L. W. Korba, Simple Permanent Magnet Motor Speed Control Circuit, IBM Technical Disclosure Bulletin, vol. 23, No. 12, May 1981, pp. 5300-5302.

Primary Examiner—Ulysses Weldon
Attorney, Agent, or Firm—Koda and Androlia

[57] ABSTRACT

A motor driving circuit comprising a pulse generating circuit for generating plural types of pulse trains, a modulation pulse generating circuit connected to the pulse generating circuit, a semiconductor driving circuit connected to an output of the modulation pulse generating circuit for providing operating power to a motor winding, a detecting circuit connected to the driving circuit for detecting a voltage induced in the motor winding, and a counting circuit connected to the detecting circuit. The detecting circuit has means for setting reference levels, detects the voltage induced in the motor winding in accordance with the reference levels during the time the semiconductor driving circuit is non-conducting, and sends control signals for regulating a next produced modulation pulse width to the counting circuit, and the modulation pulse generating circuit shapes the modulation pulse from the plural types of pulse trains of the pulse generating circuit in accordance with outputs of the counting circuit so as to drive the motor uniformly.

7 Claims, 11 Drawing Figures

MOTOR DRIVING CIRCUITS

BACKGROUND OF THE INVENTION

1. Field of the Invention

This invention relates to improvements in speed control systems for direct current motor driving circuits.

2. Prior Art

Conventionally it is known that motor speeds are controlled by detecting the induced voltage of a generator which is directly coupled to the motor rotating shaft or by indirectly detecting the induced voltage of a motor by use of a bridge servomechanism in which one of the unknown resistors of the Wheatstone bridge is replaced with the motor. With the former system, however, the generator makes the motor load heavy, which causes the power consumption and system size to increase. On the other hand, the latter has the following disadvantages: The power dissipated at each resistor of the bridge cannot be neglected. Also since each resistance varies with temperature changes, a thermistor and such are necessary to compensate for this variation. Furthermore, because of its aging effect, the motor is subject to change in commutator-and-brush contact resistance and considerable variation in rotating speed caused by the aging drift.

FIG. 1 is a block diagram of an embodiment of the conventional motor driving circuit, in which reference numeral 101 is a wave shaping circuit comprising an integrating circuit for smoothing the waveform; 102 is a driving circuit; 103 is a motor; 104 is a generator directly coupled to the motor shaft; and 105 is a detecting circuit for detecting the induced voltage of the generator. The variation in motor rotating speed is detected as the variation in the induced voltage of the generator and is made smooth through the wave shaping circuit so as to vary the bias current of the driving circuit and provide a fixed speed. The disadvantage of the system, as mentioned above, is that since the generator is directly coupled to the motor shaft, the motor load and power consumption are increased. In addition, the use of an integrating circuit as a wave shaping circuit not only increases the time constant in the control system but also degrades the response.

SUMMARY OF THE INVENTION

This invention provides a motor driving circuit using a very stable speed control system which remedies the above disadvantages and operates with a low power consumption, and which are caparable of miniaturization and free of the variation in rotating speed caused by the aging drift.

According to the present invention, there is provided a motor driving circuit comprising: a pulse generating circuit for generating plural types of pulse trains; a modulation pulse generating circuit connected to said pulse generating circuit; a semiconductor driving circuit connected to an output of said modulation pulse generating circuit for providing operating power to a motor winding; and a detecting circuit connected to said semiconductor driving circuit for detecting a voltage induced in said motor winding, said detecting circuit including means for setting a reference level, detecting the voltage induced in said motor winding in accordance with said reference level during the time said semiconductor driving circuit is non-conducting and sending a control signal for regulating a next produced modulation pulse width to said modulation pulse generating circuit corresponding to said detected voltage, and said modulation pulse generating circuit shaping said modulation pulse from said plural types of pulse trains of said pulse generating circuit in accordance with said control signal so as to drive said motor uniformly. Also, there is provided a motor driving circuit comprising: a pulse generating circuit for generating plural types of pulse trains; a modulation pulse generating circuit connected to said pulse generating circuit; a semiconductor driving circuit connected to an output of said modulation pulse generating circuit for providing operating power to a motor winding; a detecting circuit connected to said driving circuit for detecting a voltage induced in said motor winding; and a counting circuit connected to said detecting circuit, said detecting circuit having means for setting reference levels, detecting said voltage induced in said motor winding in accordance with said reference levels during the time said semiconductor driving circuit is nonconducting, and sending control signals for regulating a next produced modulation pulse width to said counting circuit, and said modulation pulse generating circuit shaping said modulation pulse from said plural types of pulse trains of the pulse generating circuit in accordance with outputs of said counting circuit so as to drive said motor uniformly.

DESCRIPTION OF THE PREFERRED EMBODIMENTS

Figure 1:
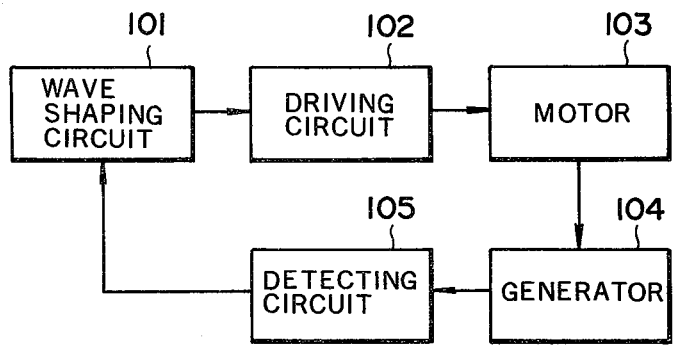
FIG. 1 is a block diagram of an embodiment of a conventional motor driving circuit.
Figure 2:
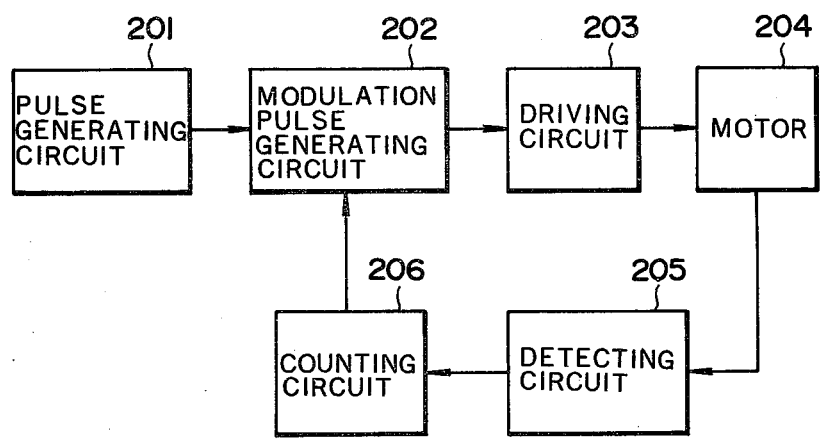
FIG. 2 is a block diagram of an embodiment of the invention.

Referring now to FIG. 2, reference numeral 201 is a pulse generating circuit; 202 is a modulation pulse generating circuit; 203 is a semiconductor driving circuit; 204 is a motor; 205 is a detecting circuit; and 206 is a counting circuit comprising a counter. The output of the counting circuit 206 corresponding to the output of the detecting circuit 205 for detecting the induced voltage of the motor during non-conducting of the driving circuit 203 controls the modulation pulse width or modulation pulse frequency, so that the number of revolutions of the motor may be kept constant. A detailed description will be made hereinafter with reference to a specific embodiment of FIG. 3.

Figure 3:
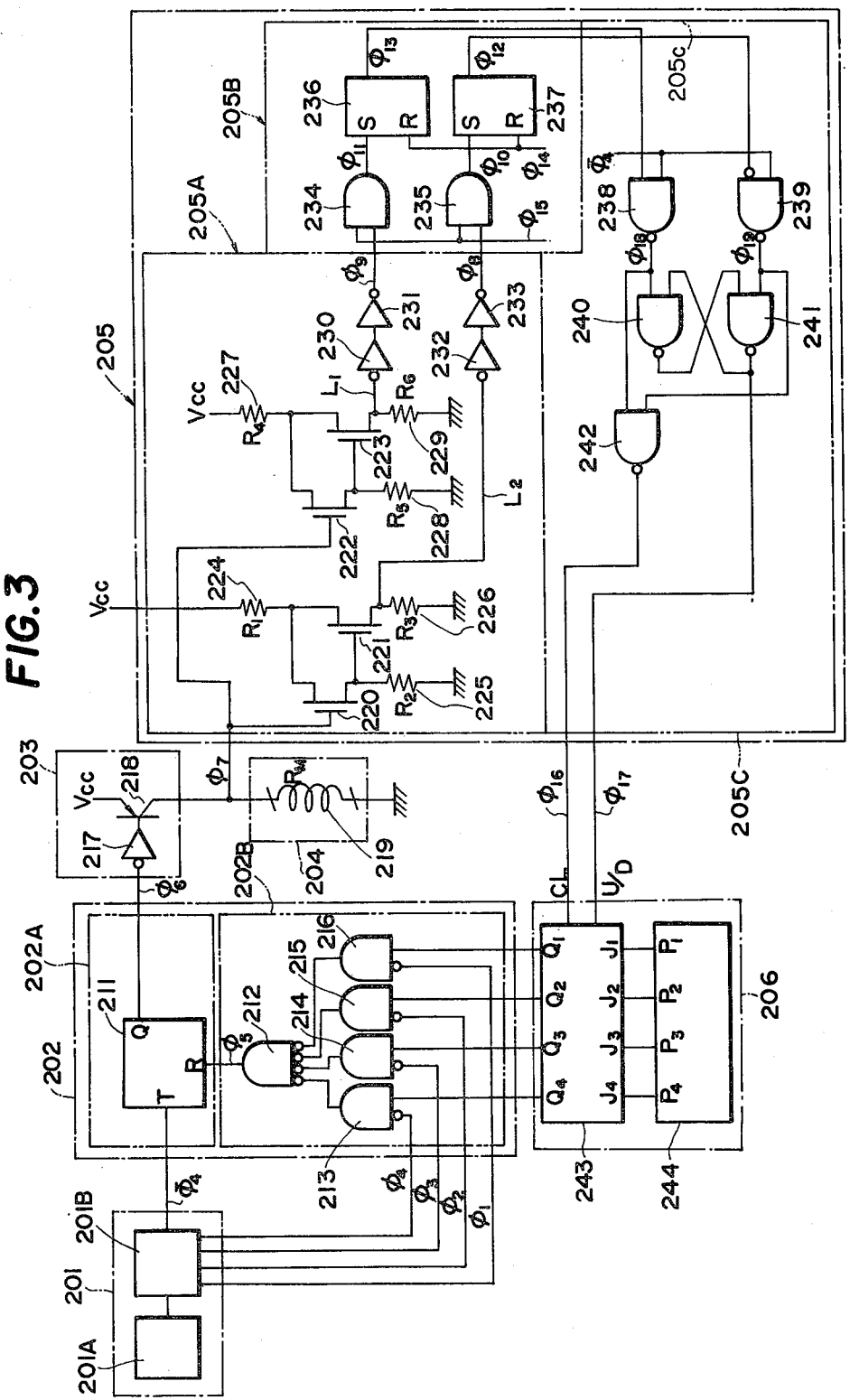
FIG. 3 is a specific circuit view of the embodiment of FIG. 2.

In FIG. 3, reference numeral 201 is a pulse generating circuit comprising a reference frequency oscillating circuit 201A and a frequency dividing circuit 201B for generating plural types of pulse trains; 202 is a modulation pulse generating circuit comprising a flip-flop 211 (202A) and a reset pulse generating circuit 202B including gates 212 to 216; 203 is a semiconductor driving circuit comprising an inverter 217 and a driving transistor 218; 204 is a motor having a motor (armature or stator) winding 219; and 205 is a detecting circuit comprising reference level setting means 205A, a sampling and storing circuit 205B and an up/down input signal generating circuit 205C. In the reference level setting means 205A, MOS transistors 220 and 221 and resistors 224 to 226 form a lower reference level (L$_2$) setting means for detecting a lower limit of the voltage induced in the motor winding 219, while MOS transistors 222 and 223 and resistors 227 to 229 form a higher reference level (L$_1$) setting means for detecting a higher limit of the voltage induced in the same motor winding 219. The sampling and storing circuit 205B includes AND gates 234 and 235 and RS flip-flop circuits 236 and 237. The output of the lower reference level setting means is applied to one of the inputs of an AND gate 235 through inverters 232 and 233 and then sampled ($\emptyset_{10}$) by a sampling pulse $\emptyset_{15}$. The voltage induced in the motor winding 219 during the time the driving transistor 218 is conducting is cut off and only the voltage induced in the motor winding 219 during the time the driving transistor 218 is non-conducting is applied to the set input of an RS flip-flop 237 and stored therein. On the other hand, the output of the higher reference level setting means is applied to one of the inputs of an AND gate 234 through inverters 230 and 231 and then sampled ($\emptyset_{11}$) by the sampling pulse $\emptyset_{15}$. The voltage induced in the motor winding 219 during the time the driving transistor 218 is conducting is cut off and only the voltage induced in the motor winding 219 during the time the driving transistor 218 is non-conducting is applied to the set input of an RS flip-flop 236 and stored therein. The up/down input signal generating circuit 205C includes first and second NAND gates 238 and 239, one input of each of them being connected to each output of the RS flip-flop circuits 236 and 237 and the other input of which being connected to an output $\overline{\emptyset_4}$ at the final stage of the frequency dividing circuit 201B; a third NAND gate 242, two inputs thereof being connected respectively to each output of the first and second NAND gates 238 and 239; and the fourth and fifth NAND gates 240 and 241, one input of each of them being connected to each output of the first and second NAND gates 238 and 239, the other input of each of the fourth and fifth NAND gates 240 and 241 being connected to each other's output whereby during the motor rotation at a rated speed, a counter clock signal $\emptyset_{16}$ is not produced at the output of the third NAND gate 242, at the time of overloading, an up counter selection signal $\emptyset_{17}$ and the counter clock signal $\emptyset_{16}$ are produced at the fifth NAND gate 241 and the third NAND gate 242, respectively, and that at the time of light loading, a down counter selection signal $\emptyset_{17}$ and the counter clock signal $\emptyset_{16}$ are produced at the fifth NAND gate 241 and the third NAND gate 242, respectively. Reference numeral 206 denotes a counting circuit comprising an up/down counter 243 and an initial value setting circuit 244 in which up/down counter outputs Q$_1$, Q$_2$, Q$_3$ and Q$_4$ control an output $\emptyset_6$ of the modulation pulse generating circuit 202.

Now, the speed control during the regular rotation of the motor 204 will be explained also with reference to FIG. 4. Each of outputs $\emptyset_1$, $\emptyset_2$, $\emptyset_3$, $\emptyset_4$ and $\overline{\emptyset_4}$ of the frequency generating circuits 201 is applied to the modulation pulse generating circuit 202. Since the reference levels of both reference level setting means of the detecting circuit 205 are usually set so that the outputs of the U/D counter 243 (for up/down counter) of the counting circuit 206 are Q$_1$=Q$_2$=Q$_3$=1 and Q$_4$=0, the reset input of the flip-flop 211 becomes the pulse indicated by $\emptyset_5$ of FIG. 4 and the pulse width of the output $\emptyset_6$ of the flip-flop 211 is $\tau_2/\tau_1$=7/16. The output $\emptyset_6$ is applied to the driving circuit 203. Then, the driving transistor 218 is conducting between t$_1$ and t$_2$ but non-conducting between t$_2$ and t$_3$. The output between t$_1$ and t$_2$ of a collector output $\emptyset_7$ is given by:

$$V_{CC}-V_{CE}=R_M I_M=A\omega \qquad (1)$$

where V$_{CC}$ is the source voltage, V$_{CE}$ is the collector-to-emitter voltage, R$_M$ is the motor winding resistance, I$_M$ is the motor winding current, A is the electromechanical coupling coefficient and $\omega$ is the angular velocity.

Also, the output between t$_2$ and t$_3$ is given by:

$$V=A\omega \qquad (2)$$

That is to say, the induced voltage of the motor 204 becomes equal to the collector output $\emptyset_7$. Assuming that the flux density is B, the effective conductor length is L and that the rotation radial is D/2, the coupling coefficient A is given by:

$$A=BL\ (D/2) \qquad (3)$$

Therefore, when the rated angular velocity $\omega$ is determined, the value of the induced voltage V$_1$ during rotation at the rated speed can be obtained. In order to keep the reference levels L$_1$ and L$_2$ in the range:

$$L_1 > V_1 > L_2 \qquad (4)$$

for example, each of MOS transistors 220 and 223 of the reference level setting means is made in the form of a P-channel and a resistance R$_1$, current I$_1$ flowing through the resistance R$_1$, resistance R$_4$ and current I$_4$ flowing through the resistance R$_4$ are adjusted so that $$L_1=V_{CC}-(V_{TH}+R_4 I_4)$$

$$L_2=V_{CC}-(V_{TH}+R_1 I_1) \qquad (5)$$

where V$_{CC}$ is the source voltage and V$_{TH}$ is the threshold voltage. V$_{TH}$ can freely be controlled by IC manufacturing techniques. Then, if the difference between V$_{TH}$ and V$_{CC}$ is equal to the reference level, resistances R$_1$ and R$_4$ can be removed. In the described embodiment, the P-channel structure is shown but the N-channel structure is of course possible. Since the output $\emptyset_7$ is substantially equal to the voltage source when the driving transistor 218 is normally conducting (t$_1$ to t$_2$), the MOS transistor 222 is non-conducting and the MOS transistor 223 is conducting. On the other hand, when the driving transistor 218 is non-conducting (t$_2$ to t$_3$), $\emptyset_7$ is below the reference level L$_1$, and hence the MOS transistor 222 is conducting and the MOS transistor 223 is non-conducting. Then, since the $\phi_9$ is low with the sampling pulse $\phi_{15}$ applied, the gate output $\phi_{11}$ is not produced, an output $\phi_{13}$ of the RS flip-flop 236 remains low and an output $\phi_{18}$ of the first NAND gate 238 of the U/D input signal generating circuit 205C remains high. With the driving transistor 218 conducting, on the other hand, the MOS transistor 220 is non-conducting and the MOS transistor 221 is conducting. Thus, since an induced voltage above the reference level $L_2$ is present even when the driving transistor 218 is non-conducting, the MOS transistor 220 remains non-conducting and the MOS transistor 221 conducting, thus keeping the condition that $\phi_8$ is high. Therefore, the pulse $\phi_{10}$ sampled through the sampling pulse $\phi_{15}$ is generated and an RS flip-flop output $\phi_{12}$ goes high. However, in the U/D input signal generating circuit 205C, an output $\phi_{19}$ of the second NAND gate 239 for receiving $\phi_{12}$ stays high and the clock pulse $\phi_4$ is not produced at the output $\phi_{16}$ of the third NAND gate 242. As a result, since the clock input of the counting circuit 206 stays low, the U/D counter selection input $\phi_{17}$ remains low and the content of the U/D counter 243 is not changed, the modulation pulse width of the output $\phi_6$ of the modulation pulse generating circuit 202 is $\tau_2/\tau_1=7/16$, which is applied to the semiconductor driving circuit 203 and the motor continues rotating uniformly.

Figure 5:
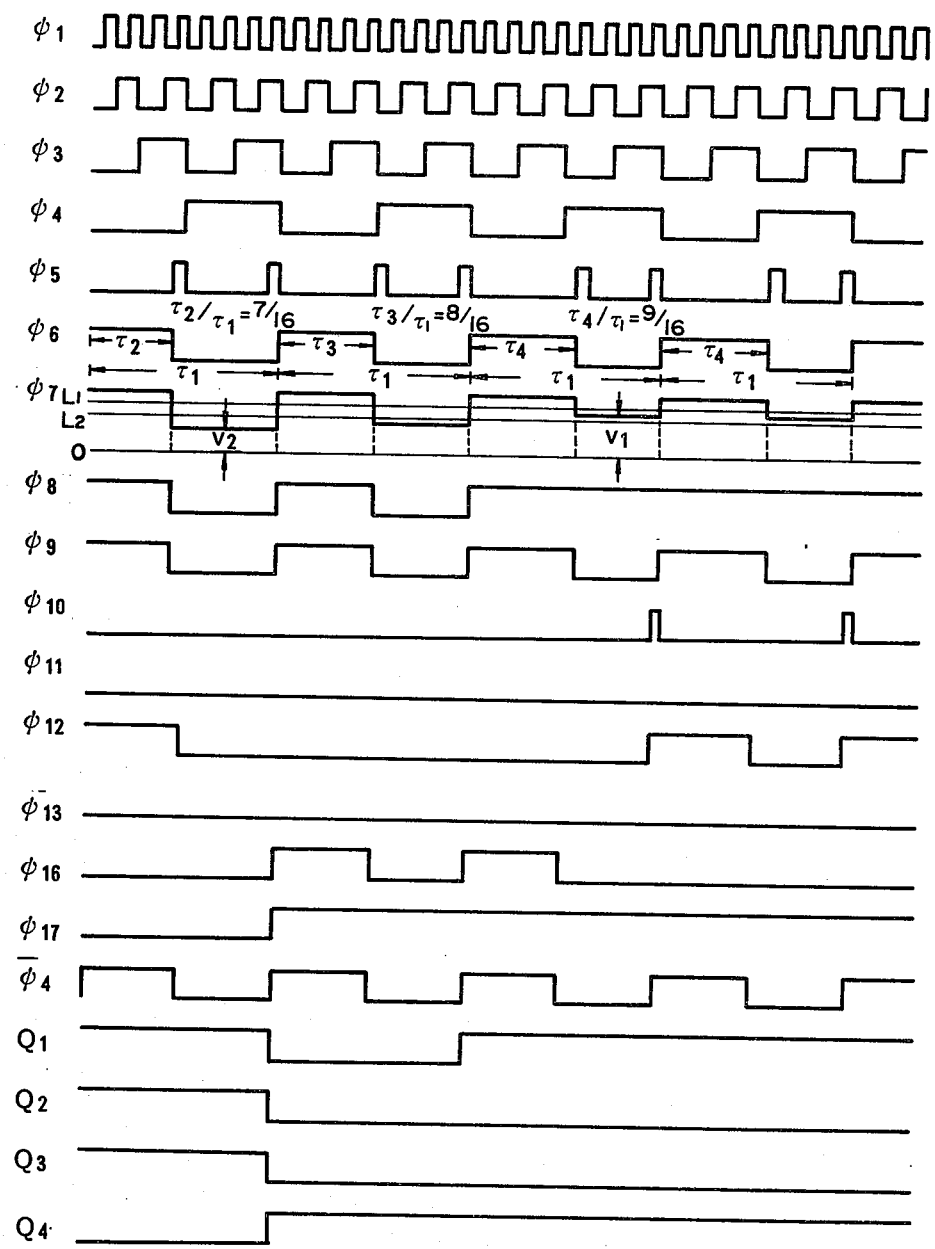
FIG. 5 is a waveform view of each component part of FIGS. 2 and 3 with the load increased.

Referring to FIG. 5, there is shown the state with the load increased. When an induced voltage $V_2$ is greater than $L_2$ with the driving transistor 218 non-conducting, the MOS transistor 220 is conducting, the MOS transistor 221 is nonconducting and $\phi_8$ goes low. The sampled data pulse output $\phi_{10}$ is not produced, the RS flip-flop output $\phi_{12}$ goes low and $\overline{\phi_{12}}$ goes high. Thus, the clock pulse $\phi_4$ results in the output $\phi_{10}$ of the second NAND gate 239, the counter clock pulse $\phi_{16}$ is generated at the output of the third NAND gate 242, the output $\phi_{17}$ of the fifth NAND gate 241 goes high and the U/D counter 206 operates as an up counter. The counter counts up by one from the condition $Q_1=Q_2=Q_3=1$ and $Q_4=0$ to the condition $Q_1=Q_2=Q_3=0$ and $Q_4=1$. The modulation pulse width of the output $\phi_6$ of the modulation pulse generating circuit 202 becomes $\tau_3/\tau_1=8/16$. Then by the receipt of the next clock pulse $\phi_{16}$, the counter 243 counts up by one to $Q_1=1$, $Q_2=Q_3=0$ and $Q_4=1$ and the modulation pulse width becomes $\tau_4/\tau_1=9/16$. At this point, when $V_1$ is greater than $L_2$, the MOS transistor 221 is conducting and $\phi_8$ goes high with the driving transistor 218 non-conducting. Thus, the sampled date pulse output $\phi_{10}$ is produced. The output $\phi_{12}$ of the RS flip-flop 237 goes high and $\overline{\phi_{12}}$ goes low. The clock pulse $\phi_4$ is not produced as the output $\phi_{19}$, and $\phi_{16}$ goes low. Then the outputs $Q_4$ to $Q_1$ to the U/D counter 206 stays in the condition $Q_1-1$, $Q_2=Q_3=0$ and $Q_4=1$, the modulation pulse width $\tau_4/\tau_1$ remains 9/16 and the motor continues rotating uniformly. Next, the state with this load reduced will be explained with reference to FIG. 6. When the induced voltage of the motor 204 is increased to cause the condition that $V_3>L_1$, the MOS transistor 222 stays non-conducting, the MOS transistor 223 stays conducting and $\phi_9$ goes high. Then, the output of the sampled data pulse $\phi_{10}$ is produced, the output $\phi_{13}$ of the RS flip-flop 236 is set high, and the clock pulse $\phi_4$ is produced at the output $\phi_{18}$ of the first NAND gate 238. As the output $\phi_{17}$ of the fifth NAND gate 241 goes low and the counter clock pulse $\phi_{16}$ is produced, the U/D counter 243 operates as a down counter and counts down by one from the condition $Q_1=1$, $Q_2=Q_3=0$ and $Q_4=1$ to the condition $Q_1=Q_2=Q_3=0$ and $Q_4=1$. The modulation pulse width is reduced from $\tau_4/\tau_1=9/16$ to $\tau_3/\tau_1=8/16$. Furthermore, by the next clock pulse $\phi_{16}$, it is reduced to $\tau_2/\tau_1=7/16$. In this state, $V_1$ is greater than $L_1$ and the motor soon returns to its normal rotation.

Figure 7:
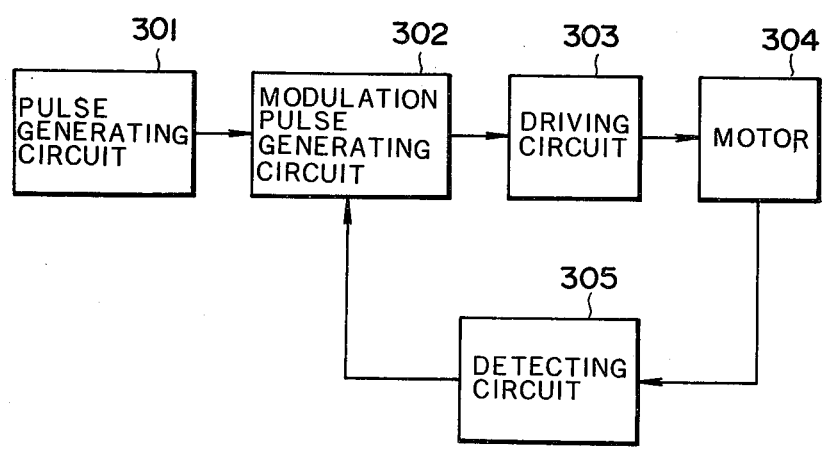
FIG. 7 is a block diagram of another embodiment of the invention.

FIG. 7 is a block diagram of another embodiment of the invention, in which reference numeral 301 is a pulse generating circuit; 302 is a modulation pulse generating circuit; 303 is a semiconductor driving circuit; 304 is a motor; and 305 is a detecting circuit.

Figure 8:
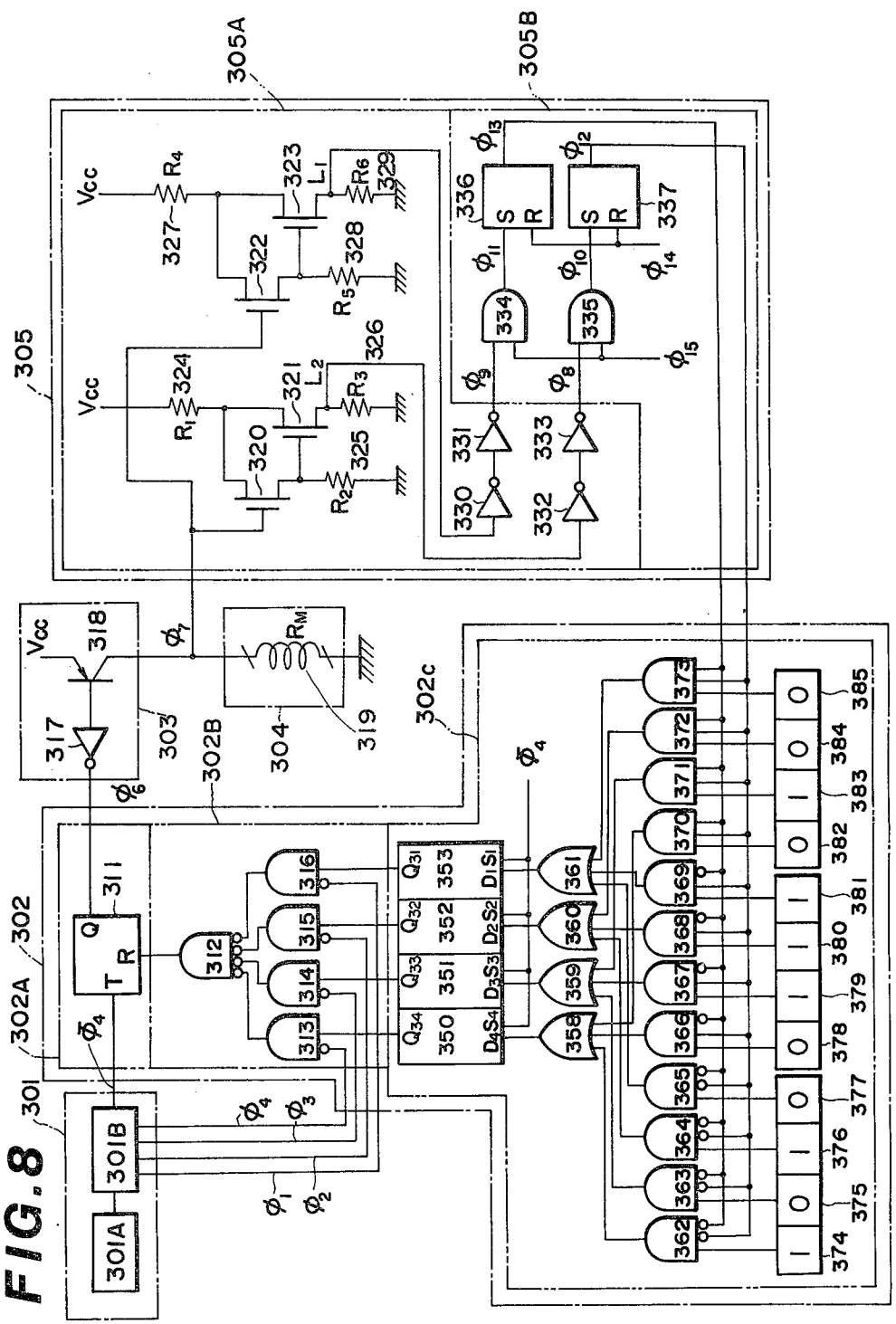
FIG. 8 is a specific circuit view of the embodiment of FIG. 7.

FIG. 8 is a detail view of FIG. 7, in which reference numeral 301 is a pulse generating circuit comprising a reference frequency oscillating circuit 301A and a frequency dividing circuit 301B for generating plural types of pulse trains; 302 is a modulation pulse generating circuit comprising a flip-flop 311 (302A), a reset pulse generating circuit 302B including gates 312 to 316, and a reset pulse control circuit 302C including three types of reset time setting circuits 374 to 377, 378 to 381 and 382 to 385, selection gate circuits 362 to 365, 366 to 369 and 370 to 373, OR gates 358 to 361 and memory circuits 350 to 353; 303 is a semiconductor driving circuit comprising an inverter 317 and a driving transistor 318; 304 is a motor having a motor winding 319; 305 is a detecting circuit comprising reference level setting means 305A and a sampling and storing circuit 305B. In the reference level setting means 305A, MOS transistors 320 and 321 and resistors 324 to 326 form a lower reference level ($L_2$) setting means for detecting a lower limit of the voltage induced in the motor winding 319, while MOS transistors 322 and 323 and resistors 327 and 329 form a higher reference level ($L_1$) setting means for detecting a higher limit of the voltage induced in the same motor winding 319. The sampling and storing circuit 305B includes AND gates 334 and 335 and RS flip-flop circuits 336 and 337. The output of the lower reference level setting means is applied to one of the inputs of an AND gate 335 through inverters 332 and 333 and then sampled ($\phi_{10}$) by a sampling pulse $\phi_{15}$. The voltage induced in the motor winding 319 during the time the driving transistor 318 is conducting is cut off and only the voltage induced in the motor winding 319 during the time the driving transistor 318 is non-conducting is applied to the set input of an RS flip-flop 337 and stored therein. On the other hand, the output of the higher reference level setting means is applied to one of the inputs of an AND gate 334 through inverters 330 and 331 and then sampled ($\phi_{11}$) by the sampling pulse $\phi_{15}$. The voltage induced in the motor winding 319 during the time the driving transistor 318 is conducting is cut off and only the voltage induced in the motor winding 319 during the time the driving transistor 318 is non-conducting is applied to the set input of an RS flip-flop 336 and stored therein. The outputs of the RS flip-flops 336 and 337 are inputted to the selection gate circuits 362 to 365, 366 to 369 and 370 to 373 of the modulation pulse generating circuit 302. Corresponding to the information of the RS flip-flops 336 and 337, one set of information of the reset time setting circuits 374 to 377, 378 to 381 and 382 to 385 is stored in the memory circuits 350 ($Q_{34}$) to 353 ($Q_{31}$) when the clock pulse $\phi_4$ rises. These outputs ($Q_{34}$ to $Q_{31}$) control an output $\phi_6$ of the modulation pulse generating circuit 302.

As will appear when compared to the circuit of FIG. 3 illustrating the first embodiment of the invention, the circuit of FIG. 8 illustrating the second embodiment of the invention is identical to that of FIG. 3 in the structure and operation of the pulse generating circuit 301, 302A and 302B of the modulation pulse generating circuit 302, semiconductor driving circuit 303, motor 304, 305A and 305B of the detecting circuit 305, and therefore, the explanation of these component parts will be omitted.

Figure 4:
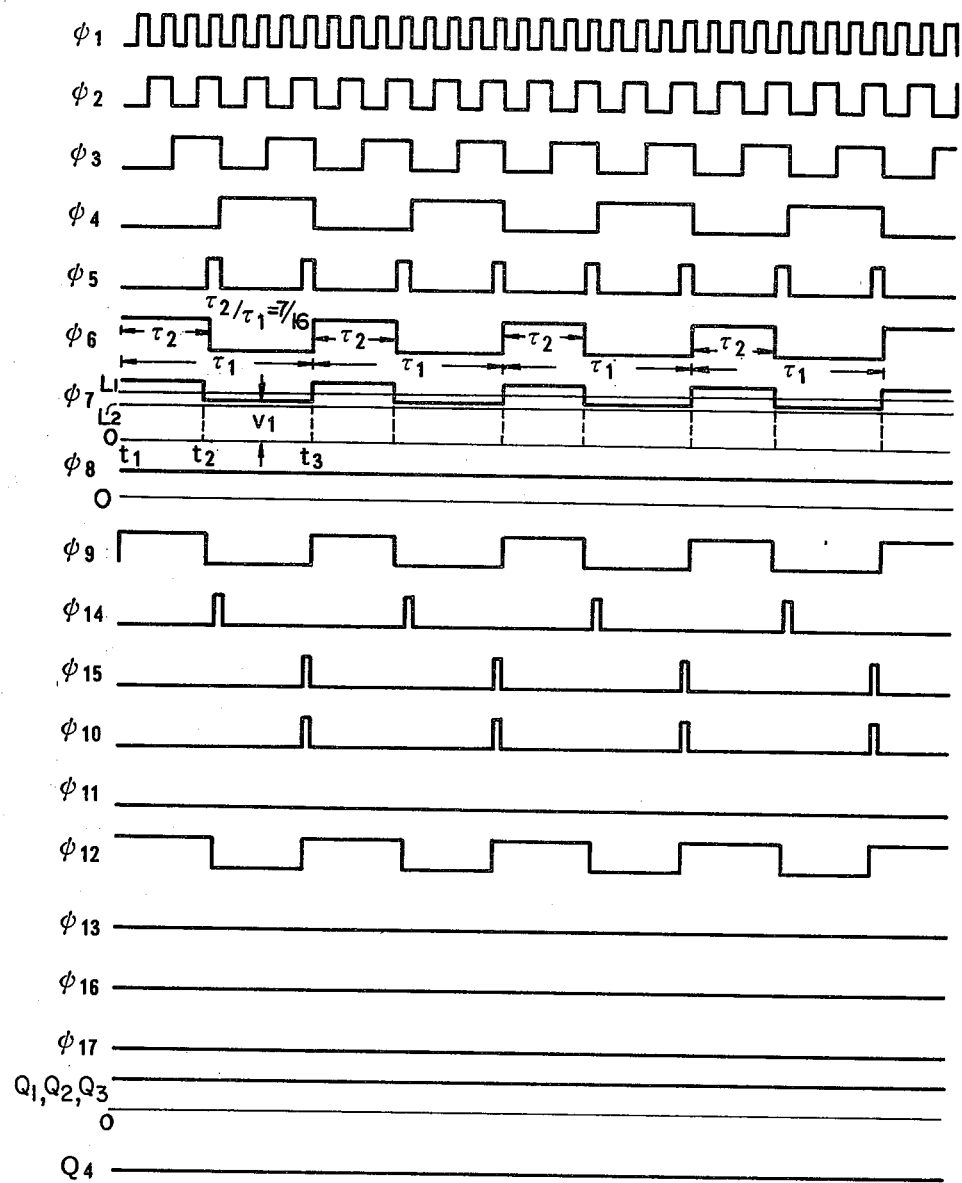
FIG. 4 is a waveform view of each component part of FIGS. 2 and 3 in the state in which the motor is turning at normal speed.
Figure 9:
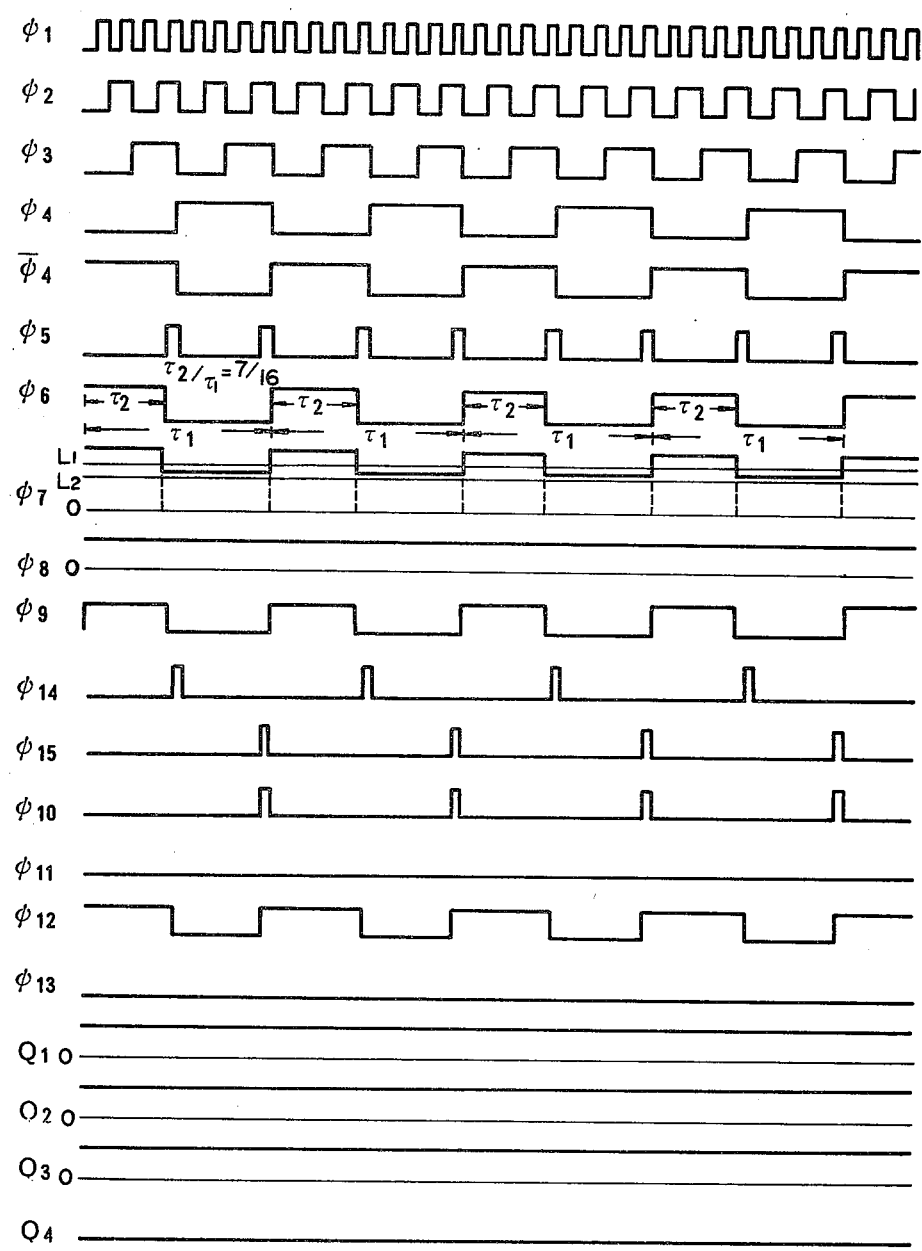
FIG. 9 is a waveform view of each component part of FIGS. 7 and 8 in the state in which the motor is turning at normal speed.

The waveforms of the respective component parts during rotation at a rated speed are shown for example in FIG. 9, which is similar to FIG. 4. This example shows that when the semiconductor driving circuit 303 is non-conducting, a voltage $\emptyset_7$ induced in the motor winding 319 is in between the lower reference level $L_2$ and the higher reference level $L_1$. In this case, when the voltage $\emptyset_7$ is sampled by the sampling pulse $\emptyset_{15}$, an output $\emptyset_{13}$ of the RS flip-flop 336 is set to "0" and an output $\emptyset_{12}$ of the RS flip-flop 337 is set to "1". As a result, the selection gates 366 to 369 become conducting, the content (0111) of the reset time setting circuits 378 to 381 is selected and applied to one input $D_4$ to $D_1$ of each of the memory circuits 350 to 353. When the next clock pulse $\emptyset_4$ is applied to the other inputs $S_4$ to $S_1$ of the memory circuits 350 to 353, this content (0111) is stored in the memory circuits 350 ($Q_{34}$) to 353 ($Q_{31}$) by the leading edge of the pulse $\emptyset_4$. A reset pulse $\emptyset_5$ is produced when the combination of pulse trains $\emptyset_4$ to $\emptyset_1$ applied from the intermediate stages of the frequency dividing circuit 301B of the pulse generating circuit 301 is equal to the content of the memory circuits 350 to 353. Consequently, the modulation pulse $\emptyset_6$ having a pulse width of $\tau_2/\tau_1 = 7/16$ is applied to the semiconductor driving circuit 303.

Figure 10:
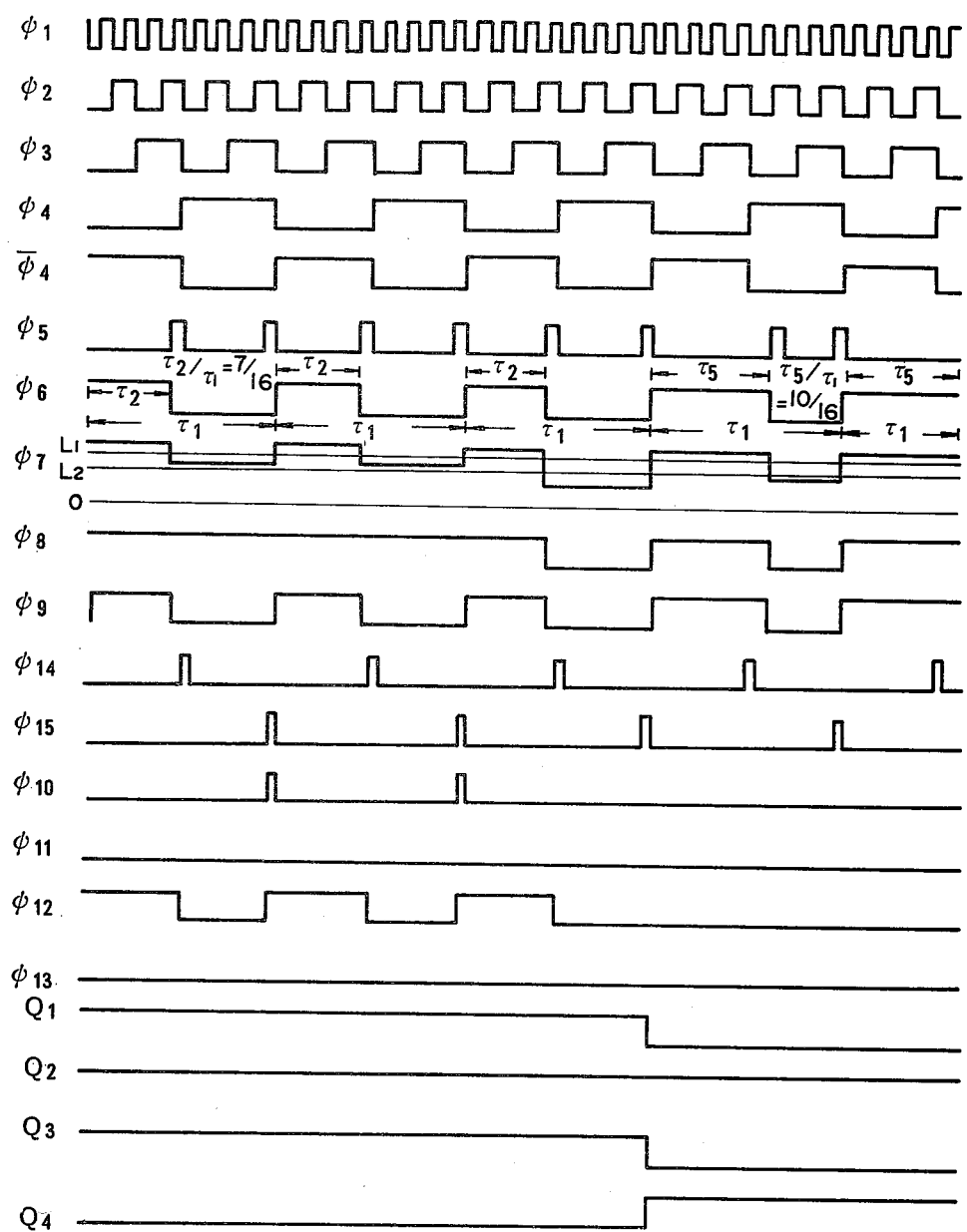
FIG. 10 is a waveform view of each component part of FIGS. 7 and 8 with the load increased.

The waveforms of the respective component parts with the load increased are shown for example in FIG. 10, which is similar to FIG. 5. This is the case where with the motor 304 turning at $\tau_2/\tau_1 = 7/16$, the load is increased and the voltage $\emptyset_7$ induced in the motor winding 319 is lower than the lower reference level $L_2$ when the driving circuit 318 is non-conducting. In this case, when sampled by the sampling pulse $\emptyset_{15}$, the output $\emptyset_{13}$ of the RS flip-flop 336 is set to "0" and the output $\emptyset_{12}$ of the RS flip-flop 337 is also set to "0". As a result, the selection gates 362 to 365 are conducting and the content (e.g. 1010) of the reset time setting circuit 374 to 377 is selected and applied to one input $D_4$ to $D_1$ of each of the memory circuits 350 to 353 through the OR gates 358 to 361. Accordingly, when the next clock pulse $\emptyset_4$ is applied to the other inputs $S_4$ to $S_1$ of the memory circuits 350 to 353, the content (1010) is stored in the memory circuits 350 ($Q_{34}$) to 353 ($Q_{31}$) by the leading edge of the pulse $\emptyset_4$. Then, the reset pulse $\emptyset_5$ is produced when the combination of pulse trains $\emptyset_4$ to $\emptyset_1$ applied from the intermediate stages of the frequency dividing circuit 301B of the pulse generating circuit 301 is equal to the content of the memory circuits 350 to 353. As a result, the modulation pulse $\emptyset_6$ having a pulse width of $\tau_5/\tau_1 = 10/16$ is applied to the driving circuit 303. This state continues until the load is reduced and the voltage $\emptyset_7$ induced in the motor winding 319 with the semiconductor driving circuit 303 non-conducting is higher than the lower reference level $L_2$.

Figure 6:
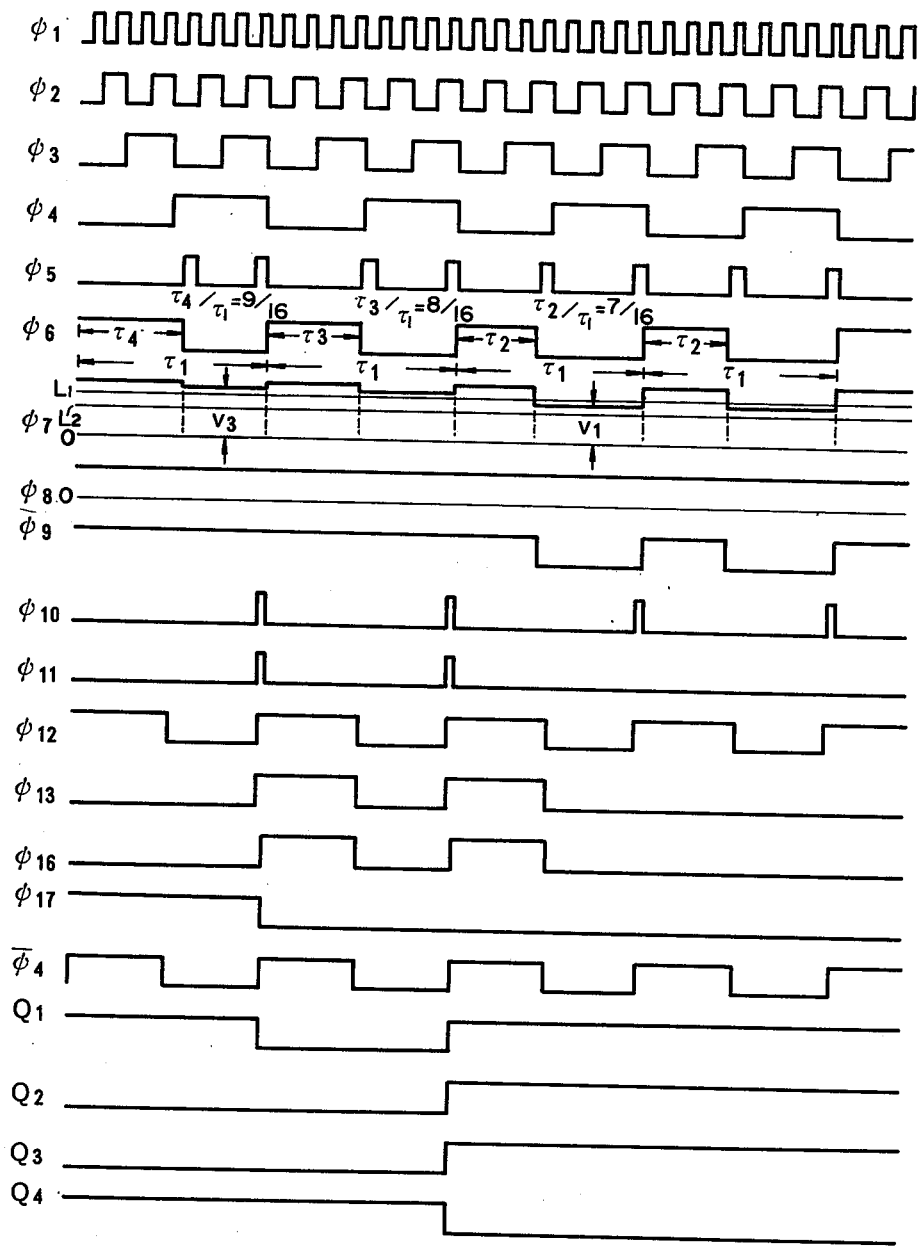
FIG. 6 is a waveform view of each component part of FIGS. 2 and 3 with the load reduced.
Figure 11:
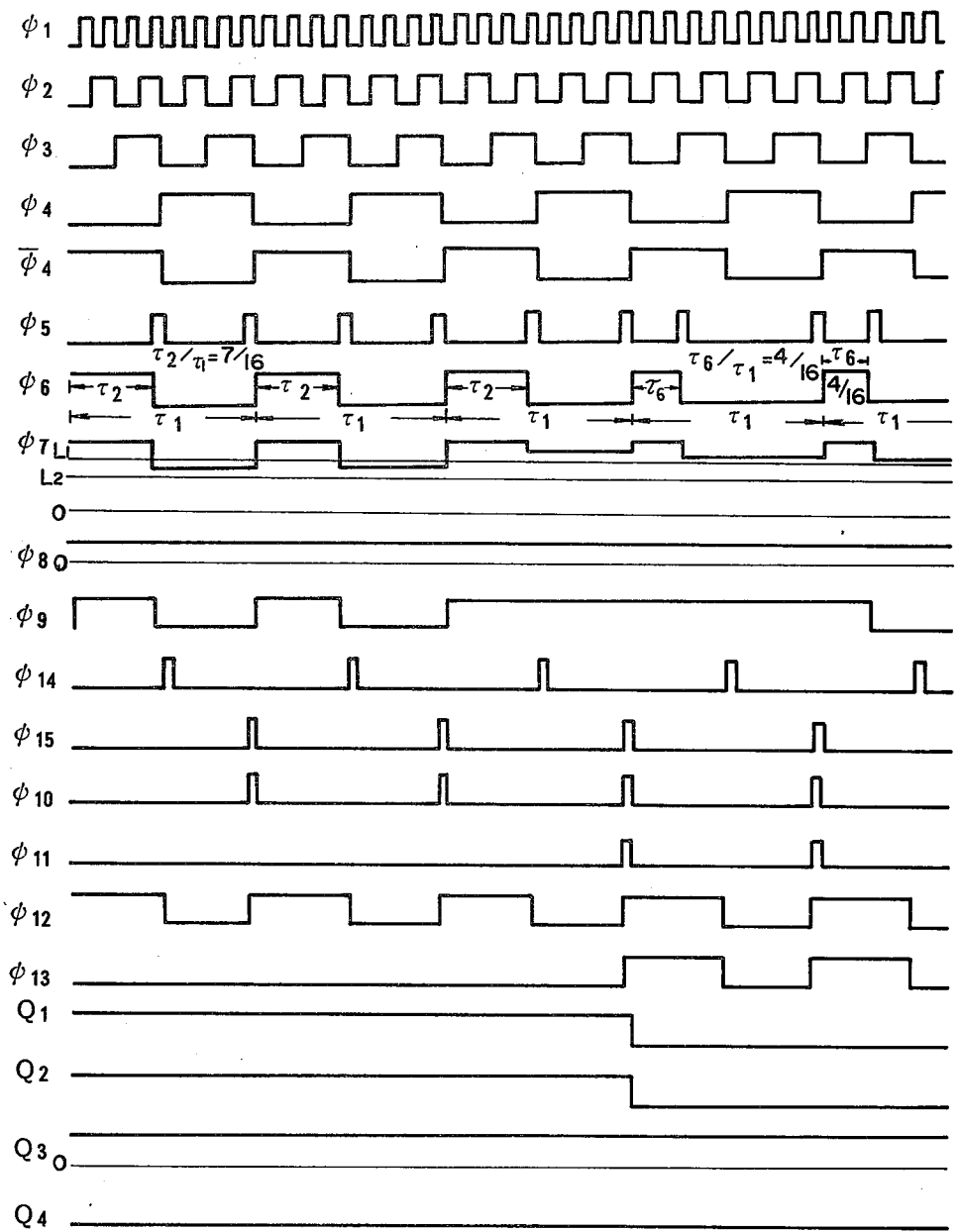
FIG. 11 is a waveform view of each component part of FIGS. 7 and 8 with the load reduced.

The waveforms of the respective component parts with the load reduced are shown for example in FIG. 11, which is similar to FIG. 6. This is the case for example where the motor 304 turning at $\tau_2/\tau_1 = 7/16$ but since this pulse width provides excessive power, it should be decreased. That is to say, although the rotation is made at $\tau_2/\tau_1 = 7/16$, the load is light and the voltage $\emptyset_7$ induced in the motor winding 319 with the semiconductor driving circuit 303 non-conducting is higher than the higher reference level $L_1$. When sampled by the sampling pulse $\emptyset_{15}$, the output $\emptyset_{13}$ of the RS flip-flop 336 is set to "1" and the output $\emptyset_{12}$ of the RS flip-flop 337 is also set to "1". Then, the selection gates 370 to 373 are conducting. The content (e.g. 0100) of the reset time setting circuits 382 to 385 is selected and applied to one input $D_4$ to $D_1$ of each of the memory circuits 350 to 353 through the OR gates 358 to 361. Therefore, when the next clock pulse $\emptyset_4$ is applied to the other inputs $S_4$ to $S_1$ of the memory circuits 350 to 353, this content (0100) is stored in the memory circuits 350 to 353 by the leading edge of the pulse $\emptyset_4$. Accordingly, the reset pulse $\emptyset_5$ is produced when the combination of the pulse trains $\emptyset_4$ to $\emptyset_1$ applied from the intermediate stages of the frequency dividing circuit 301B of the pulse generating circuit 301 is equal to the content $Q_{34}$ to $Q_{31}$ of the memory circuits 350 to 353. As a result, the modulation pulse $\emptyset_6$ having a pulse width of $\tau_6/\tau_1 = 4/16$ is applied to the driving circuit 303. This state continues until the load is increased and the voltage $\emptyset_7$ induced in the motor winding 319 with the semiconductor driving circuit 303 non-conducting is lower than the higher reference level $L_1$.

As will appear from the foregoing, with the system of the second embodiment, the three values with relatively large differences are preset in the reset time setting circuits 302C so as to compensate for a load at a time, depending on the state of the load. When the voltage $\emptyset_7$ induced in the motor winding 319 with the semiconductor driving circuit 303 non-conducting is balanced with the load between the higher reference level $L_1$ and the lower reference level $L_2$, the output of the modulation pulse generating circuit 302 keeps a fixed value of $\tau_2/\tau_1 = 7/16$. However, if the induced voltage $\emptyset_7$ is higher than the higher reference level $L_1$, the system acts so as to drop the voltage, and if the induced voltage $\emptyset_7$ is lower than the lower reference level $L_2$, the system acts so as to rise the voltage. Thus, the compensation operation is repeated so as to return the motor speed to the fixed range. In this respect, this second embodiment is different from the abovementioned first embodiment. In the first embodiment, every drive cycle, the voltage gradually approaches between the reference levels $L_1$ and $L_2$ and finally, at the intermediate point, it is stable with a pulse width balanced with the load, thus maintaining the fixed speed of the motor. Needless to say, if in the second embodiment more detecting circuits and reset time setting circuits are added so as to control finely the pulse width corresponding to the load, the speed can be stable within the narrower ranges.

As discussed above, this invention is of the type in which the voltage induced in the motor is detected when the driving semiconductor device is non-conducting, thereby eliminating the need for a generator and hence reducing the motor load. Thus, the operation with a low power consumption and miniaturization are possible. Furthermore, with the elimination of bridge resistors, there is no variation through aging drift and with the elimination of an integrating circuit for shaping waveform, the time constant is reduced in the control system. As a result, motor driving circuits having good response times can be realized.

What is claimed is:
1. A motor driving circuit comprising:
   a pulse generating circuit including a reference frequency oscillating circuit and a frequency dividing circuit connected to said reference frequency oscil- lating circuit, said frequency dividing circuit comprising a plurality of stages, and an output at the final stage of said frequency dividing circuit and outputs at the intermediate stages thereof generating plural types of pulse trains;

a modulation pulse generating circuit including a flip-flop circuit whose input is connected to the output at the final stage of said frequency dividing circuit and a reset pulse generating circuit some inputs of which are connected to the outputs at the intermediate stages of said frequency dividing circuits and whose output is connected to a reset terminal of said flip-flop circuit;

a semiconductor driving circuit connected to an output of said modulation pulse generating circuit for providing operating power to a motor winding; and a detecting circuit connected to said semiconductor driving circuit for detecting a voltage induced in said motor winding, said detecting circuit including means for setting a reference level, detecting the voltage induced in said motor winding in accordance with said reference level during the time said semiconductor driving circuit is non-conducting and sending a control signal for regulating a next produced modulation pulse width to said modulation pulse generating circuit corresponding to said detected voltage, input circuits of said means being formed of metal oxide semiconductor transistors which have high input impedance, said flip-flop circuit being set by the output at the final stage of said frequency dividing circuit and said reset pulse generating circuit generating a reset pulse when the outputs at the intermediate states of said frequency dividing circuit match a value determined by the control signal given by said detecting circuit, whereby said modulating pulse generating circuit shapes said modulation pulse from said plural types of pulse trains of said pulse generating circuit in accordance with said control signal so as to drive said motor uniformly.

2. The motor driving circuit according to claim 1 wherein said detecting circuit comprises a plurality of reference level setting means for detecting the voltage induced in said motor winding, and a circuit for sampling and storing the detected voltage during the time said semiconductor driving circuit is non-conducting.

3. The motor driving circuit according to claim 2 wherein said modulation pulse generating circuit further comprises a reset pulse control circuit including a plurality of reset time setting circuits corresponding to an output of said sampling and storing circuit, selection gate circuits for selecting said reset time setting circuits corresponding to said sampling and storing circuit, and memory circuits for storing the content of the selected one of said reset time setting circuits whereby said reset pulse generating circuit generates the reset pulse when the outputs at the intermediate stages of said frequency dividing circuit of said pulse generating circuit match the content of said memory circuits.

4. A motor driving circuit comprising:

a pulse generating circuit including a reference frequency oscillating circuit and a frequency dividing circuit connected to said reference frequency oscillating circuit, said frequency dividing circuit comprising a plurality of stages, an output at the final stage of said frequency dividing circuit and outputs at the intermediate stages thereof generating plural types of pulse trains;

a modulation pulse generating circuit including a flip-flop circuit whose input is connected to said frequency dividing circuit and a reset pulse generating circuit some inputs which are connected to the outputs at the intermediate stages of said frequency dividing circuit and whose output is connected to a reset terminal of said flip-flop circuit;

a semiconductor driving circuit connected to an output of said modulation pulse generating circuit for providing operating power to a motor winding;

a detecting circuit connected to said driving circuit for detecting a voltage induced in said motor winding; and a counting circuit whose input is connected to said detecting circuit and whose outputs are connected to the other inputs of said reset pulse generating circuit;

said detecting circuit having means for setting reference levels, detecting said voltage induced in said motor winding in accordance with the said reference levels during the time said semiconductor driving circuit is non-conducting, and sending control signals for regulating a next produced modulation pulse width to said counting circuit, input circuits of said means being formed of metal oxide semiconductor transistors which have each high input impedance, said flip-flop circuit being set by the output of said frequency dividing circuit, and said reset pulse generating circuit generating a reset pulse when the outputs at the intermediate stages of said frequency dividing circuit of said pulse generating circuit match a value counted in said counting circuit, whereby said modulation pulse generating circuit shapes said modulation pulse from said plural types of pulse trains of the pulse generating circuit in accordance with outputs of said counting circuit so as to drive said motor uniformly.

5. The motor driving circuit according to claim 4 wherein said counting circuit includes an up/down counter; and an initial value setting circuit connected to inputs of said counter, initial outputs of said counting circuit being set by said initial value setting circuit and said up/down counter counting the timing to provide the reset pulse for determining the next produced modulation pulse width in accordance with the outputs of said detecting circuit after the motor comes into operation.

6. The motor driving circuit according to claim 4, wherein said reference level setting means including a lower reference setting means for detecting the lower limit of the voltage induced in said motor winding and a higher reference level setting means for detecting the higher limit of the voltage induced in the same motor winding, and wherein said detecting circuit further comprises circuits for sampling and storing said detected voltage during the time said driving circuit is non-conducting and an up/down input signal generating circuit for providing said control signals to said counting circuit in accordance with the outputs of said sampling and storing circuits.

7. The motor driving circuit according to claim 6 wherein said up/down input signal generating circuit includes first and second NAND gates, one input of each of said first and second NAND gates being connected to each output of said sampling and storing circuits and the other input of which being connected to the output at the final stage of said frequency dividing circuit of said pulse generating circuit; a third NAND gate, two inputs thereof being connected respectively to each output of said first and second NAND gates; and fourth and fifth NAND gates, one input of each of them being connected to each output of said first and second NAND gates, the other input of each of said fourth and fifth NAND gates being connected to each other's output, and wherein said control signals include an up-/down selection signal and a counter clock signal whereby during the motor rotation at a rated speed, said counter clock signal is not produced at the output of said third NAND gate, at the time of overloading, the up counter selection signal and the counter clock signal are produced, and at the time of light loading, the down counter selection signal and the counter clock signal are produced at said fifth NAND gate and said third NAND gate, respectively.

* * * * *